Jan. 30, 1940.  A. C. ROUTH  2,188,418
APPARATUS FOR MAKING BARS OF ICE CREAM OR THE LIKE
Filed July 22, 1936  3 Sheets-Sheet 2
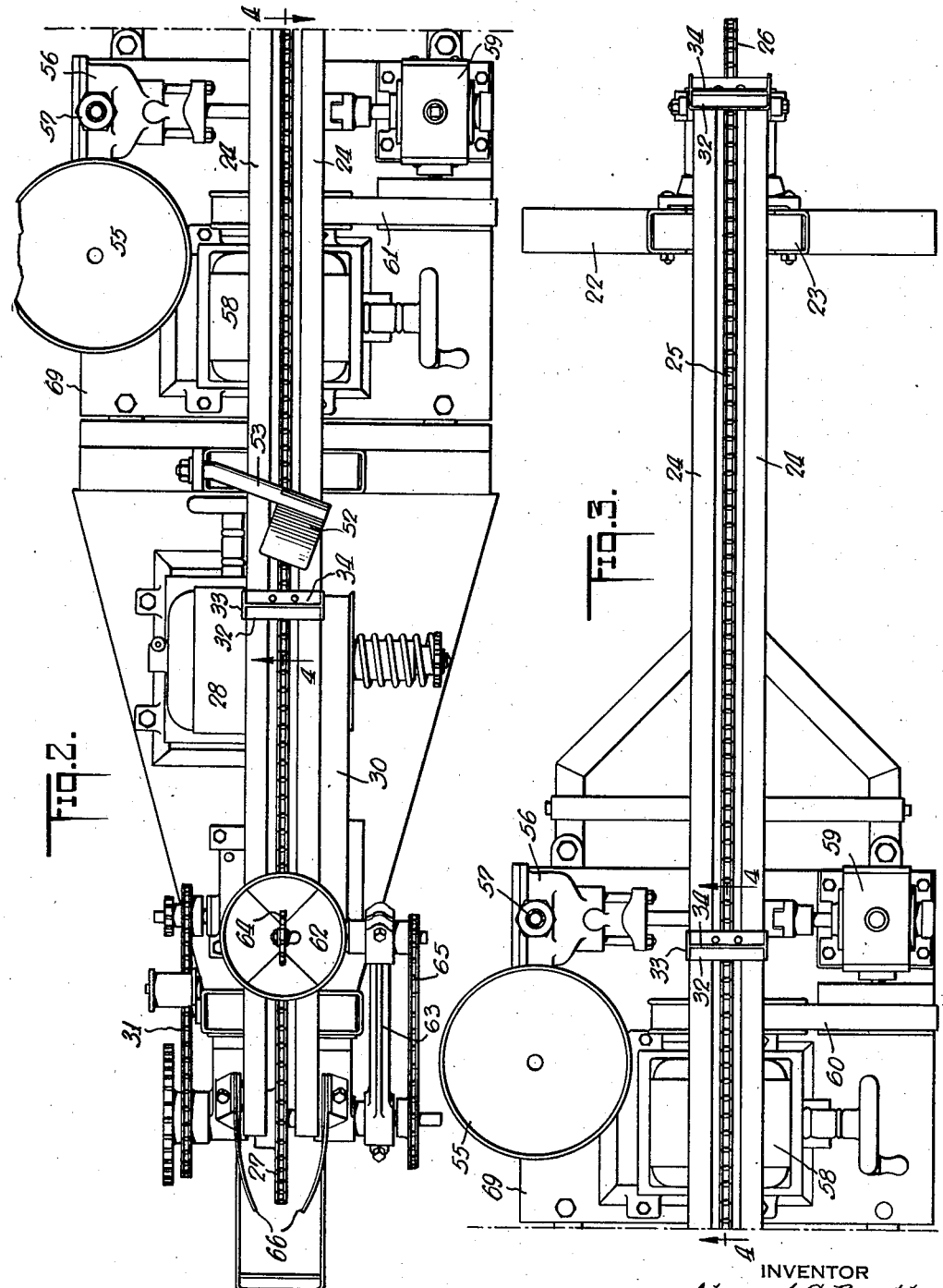
INVENTOR
Almond C. Routh
BY
ATTORNEYS

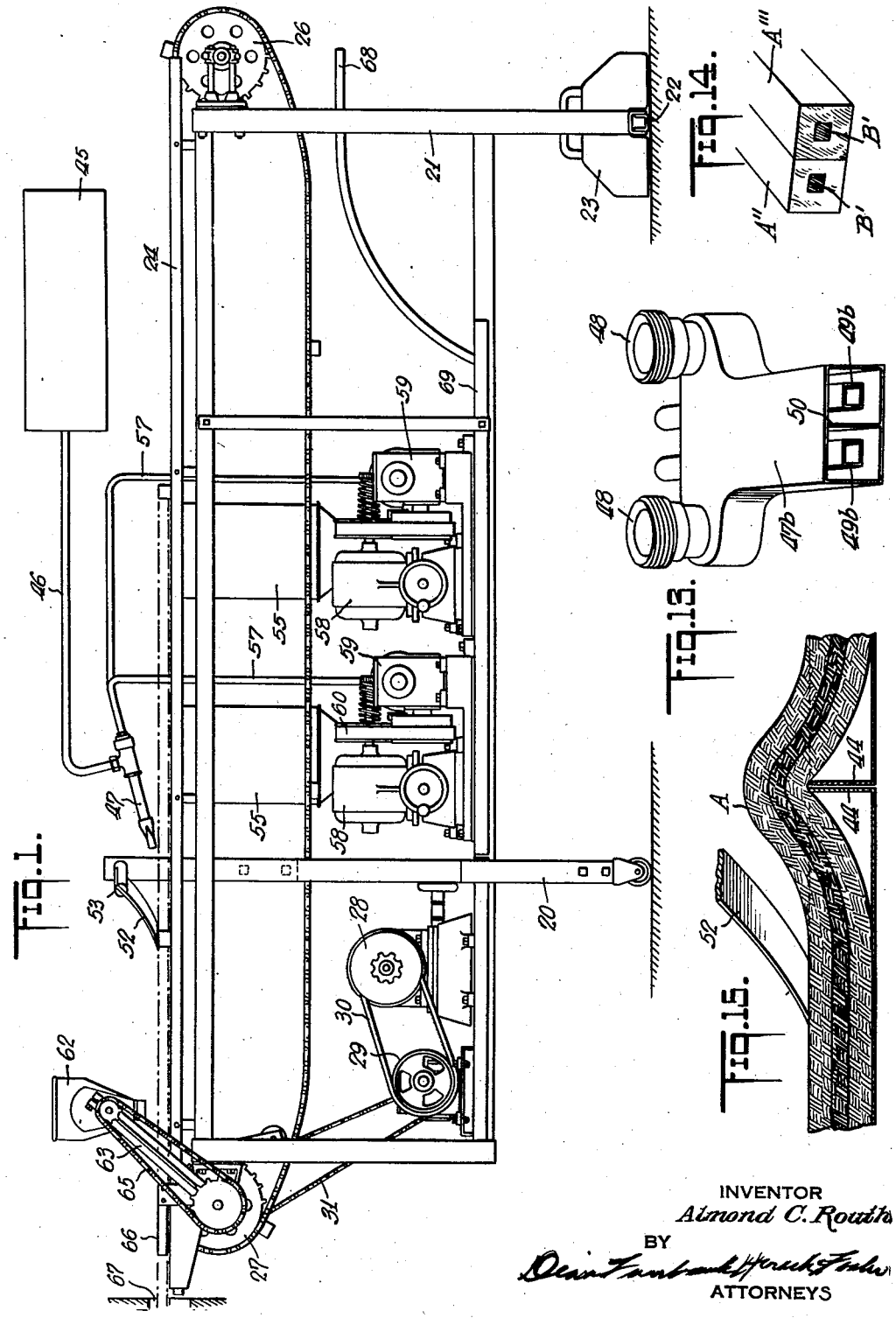

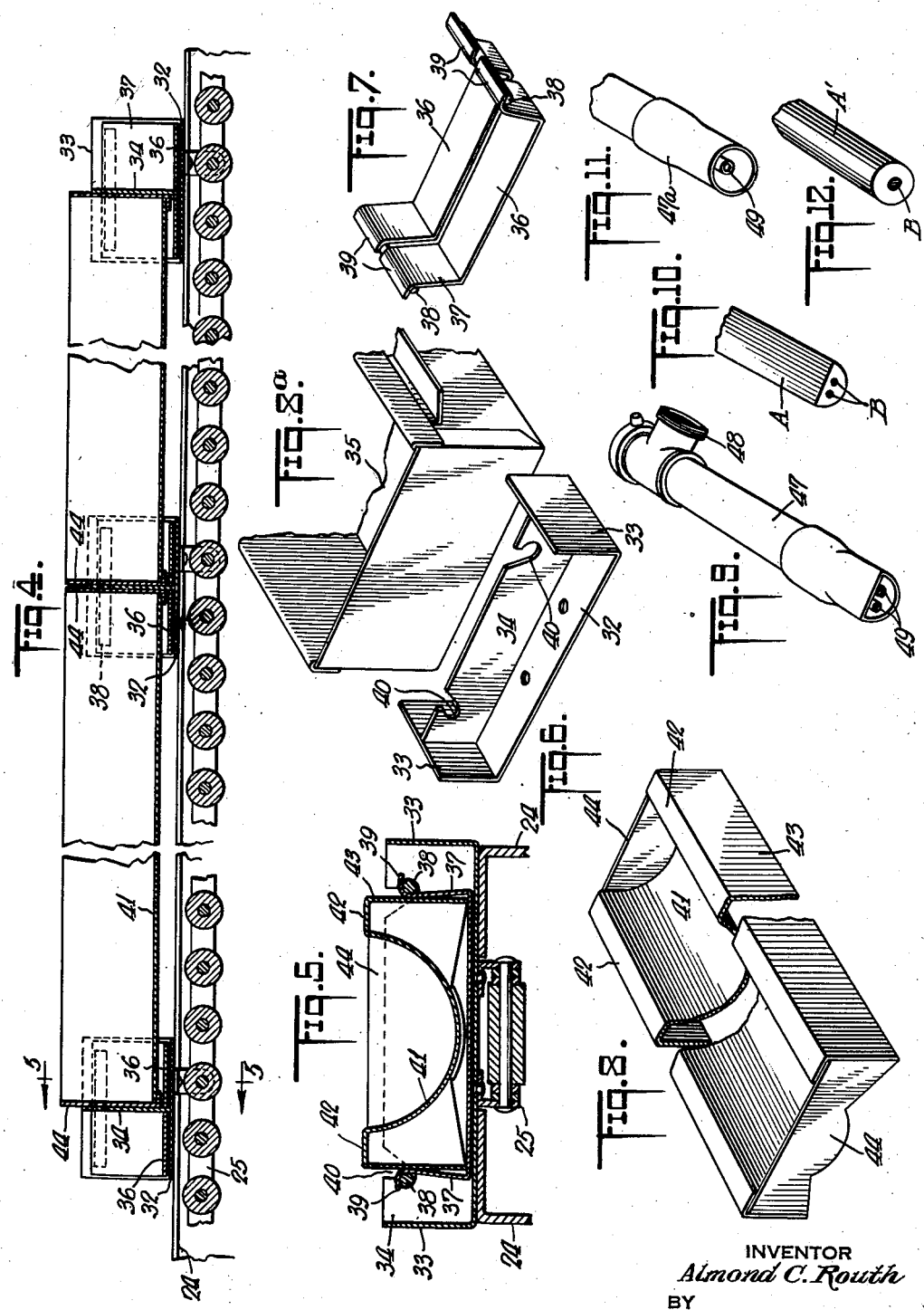

Patented Jan. 30, 1940

2,188,418

UNITED STATES PATENT OFFICE 2,188,418

APPARATUS FOR MAKING BARS OF ICE CREAM OR THE LIKE

Almond C. Routh, Sandusky, Ohio

Application July 22, 1936, Serial No. 91,889

3 Claims. (Cl. 107—20)

This invention relates to apparatus for making formed portions of plastic comestibles, and more particularly to that type of apparatus in which the ice cream in a comparatively stiff condition and of form retaining stiffness is continuously extruded from a continuous freezer or other source of supply, and the extruded bar is delivered to the hardening room in trays each containing a unit length of the bar.

As one important feature of my improved apparatus I provide means whereby trays of various different shapes and sizes may be detachably secured to an endless conveyer and advanced beneath the extrusion nozzle.

As a further important feature I provide means whereby the end walls of the trays are caused to serve as cutting means for subdividing the bar into unit lengths, one in each tray.

As a further important feature I provide a portable apparatus carrying all of the essential parts and which may be readily moved to proper position in respect to the continuous freezer or other source of supply when it is desired to employ the apparatus and may be readily detached and removed when it is desired to employ the freezer for the filling of cans or other containers.

As a further important feature I provide as a part of the portable apparatus means whereby one or more cores of a different comestible may be delivered simultaneously with and inside of the extruded bar of ice cream.

As a further important feature I provide means whereby fruit, nuts or other solid particles may be delivered at the desired rate and caused to adhere to the surface of the bar.

The invention involves various other important features and many advantages as will be pointed out hereinafter or be apparent from a consideration of the following description of certain forms of the apparatus.

In these drawings:

Fig. 1 is a side elevation of my improved apparatus, the trays being shown in dot and dash lines, and the continuous pressure freezer being indicated merely diagrammatically, Fig. 2 is a top plan view of the left half of the apparatus shown in Fig. 1, Fig. 3 is a top plan view of the right half of the apparatus shown in Fig. 1, Fig. 4 is a central vertical section on the line 4—4 of Fig. 2 and showing the trays in place, Fig. 5 is a section on the line 5—5 of Fig. 4.

Fig. 6 is a perspective view of one of the flights attached to the endless conveyer, Fig. 7 is a perspective view of an auxiliary or supplemental section which may be attached to the flights shown in Fig. 6 for use in supporting a different size of tray, Fig. 8 is a perspective view of the form of tray shown in Fig. 5 and which may be supported by the flight attachment shown in Fig. 7.

Fig. 8a is a perspective view of a portion of a larger tray which may be supported directly by the flight shown in Fig. 6, Fig. 9 is a perspective view of an extrusion nozzle which may be employed, Fig. 10 is a perspective view of the bar which may be formed by the use of the nozzle shown in Fig. 9, Fig. 11 is a perspective view of a different form of extrusion nozzle, Fig. 12 is a perspective view of the bar which may be formed by the use of the nozzle shown in Fig. 11, Fig. 13 is a perspective view of a further form of nozzle which may be used with the tray shown in Fig. 8, Fig. 14 is a perspective view of a portion of an extruded bar made by use of the nozzle shown in Fig. 13, and Fig. 15 is a sectional detail illustrating the operation of the ends of the trays as cutting means.

The apparatus illustrated includes a portable frame having a pair of supporting legs 20 adjacent to one end and which may be provided with suitable rollers. Somewhat similar legs 21 are at the opposite end of the apparatus, and these instead of having rollers preferably have a transverse bar 22 at the lower end over which may be placed a detachable weight 23. When it is desired to move the apparatus into position the weight 23 is removed, the right hand end of the apparatus lifted, and the apparatus moved along on the rollers of the legs 20. When the apparatus is in position the weight 23 may be applied to firmly hold the apparatus against movement resulting from any jarring or vibration of the parts carried by the main frame.

Extending lengthwise of the frame at the top is a pair of guide bars 24 between which extends the upper horizontal run 25 of an endless conveyer preferably in the form of a chain. This conveyer is supported by sprocket wheels 26 and 27 so as to advance the chain with the upper horizontal run moving toward the left as shown in Figs. 1, 2 and 3.

For advancing the chain at a uniform rate the frame carries an electric motor 28 driving a pulley 29 through a belt 30, and the shaft of this pulley is connected to the shaft of the sprocket wheel 27 by a pair of sprocket wheels and a chain 31. The motor 28 is preferably of a uniform speed type, and means are provided whereby the speed of the chain may be varied in respect to that of the motor so as to synchronize the movement of the chain with the rate of production of the ice cream or other plastic comestible delivered by the continuous freezer. Merely as an example, one of the pulleys of the chain 30 may be of the double cone type with a spring for pressing the cones together. The motor 28 may be adjusted lengthwise of the frame to draw the belt down between the cones and spread them apart, thus varying the driving ratio. Various other means might be employed for varying the speed of the sprocket 27 in respect to that of the motor.

The conveyer chain is provided with a plurality of flights for receiving, supporting and advancing the trays for the extruded material. Each flight is preferably constructed as shown in Fig. 6, and includes a bottom plate 32 which may be bolted or riveted to the chain, a pair of vertical end walls 33 and a partition wall 34. The plate 32 may serve to support the end of a tray, the end walls 33 may hold the tray against lateral movement and the partition 34 serve to space adjacent ends of successive trays. The ends of the flights are supported on and slide along the guides 24.

In Fig. 8a there is illustrated merely as an example a tray 35 which may be supported by the flight shown in Fig. 6. This is preferably formed of sheet metal and is illustrated as rectangular in cross-section and of somewhat greater height than the height of the partition 34. It is of such size that it will fit against the partition 34, between the end walls 33 and rest on the plate 32.

For supporting smaller trays there is provided an adapter or auxiliary flight member, one form of which is shown in Fig. 7. This includes a pair of sheet metal bars, each having a base portion 36 and end portions 37. The two bars are permanently connected in spaced relationship by rods 38 which may be soldered or otherwise attached to the outer sides of the end walls 37 and beneath outwardly extending flanges 39. The end walls are slightly resilient and the spacing between the two bars is only slightly greater than the thickness of the partition wall 34 of the flight shown in Fig. 6. Such partition wall is provided at its upper edge with a pair of slots, recesses or notches 40 which are inclined toward each other. These slots are so spaced that the adapter shown in Fig. 7 may be slipped down over the partition 34 with one of the rods 38 in one of the notches 40, and then by pressing the opposite ends of the adapter toward each other the other rod 38 may be caused to enter the other notch 40. Due to the resiliency of the adapter the ends will then spread apart slightly, and the adapter will be firmly held in position in the recesses. The end walls 37 of the adapter are spaced to a lesser distance than the end walls 33 so that a narrower tray or pan may be supported on the base 36 and between the end walls 37 and abut against the partition 34.

In Fig. 5 I have illustrated the adapter in place and serving to support a tray of the type shown more in detail in Fig. 8. This tray has a substantially semi-cylindrical chamber formed by a curved bottom wall 41, narrow top walls 42 and side walls 43, all bent from a single piece of sheet metal. The walls may be held in proper relative positions by end walls 44.

The ice cream or other plastic material employed for forming the product may be delivered from a continuous pressure freezer 45 which is only diagrammatically illustrated. The ice cream is continuously delivered frozen to a form retaining consistency through a pipe 46 to a nozzle which is so constructed that it may also be connected to a second source of material for forming a core inside the extruded bar.

If the tray or pan shown in Figs. 5 and 8 be employed the nozzle is preferably one which will extrude a bar of cylindrical, semi-cylindrical or other shape, presenting a curved surface.

In Fig. 9 there is shown a nozzle 47 with its outlet substantially semi-cylindrical and having a coupling 48 for connection to the pipe 46. Extending through this nozzle is a pair of inner nozzles 49 through which the core forming material is delivered so that the extruded bar will be substantially of the shape shown in Fig. 10 with a semi-cylindrical body portion A of ice cream and cores B, B of a different material.

In Fig. 11 there is shown a nozzle 47a which may be similar to that shown in Fig. 9 except that it has a circular outlet with a single inner nozzle 49 for forming a bar as shown in Fig. 12 which has a cylindrical body portion A' and a single core B.

If it is desired to form a rectangular bar, the pan or tray shown in Fig. 8a may be employed and in connection with that tray there may be employed a nozzle 47b shown in Fig. 13. This has a central partition 50 and a pair of couplings 48 for connection to two separate continuous ice cream freezers delivering ice cream of different flavors. In each section of the nozzle at opposite sides of the partition are inner nozzles 49b which may, if desired, also be of rectangular form. By means of this nozzle there may be produced a bar as shown in Fig. 14 which includes two merged body portions A" and A''', each with a core B'.

The nozzle is supported in any suitable manner above the path of movement of the trays and the extruded material drops into the trays as a continuous bar, the rate of movement of the bars being synchronized with the rate of delivery of the ice cream. As the ice cream bar A passes over the juxtaposed end walls 44 of two trays, it will temporarily form a loop over those end walls as shown somewhat ideally in Fig. 15. As the trays advance the softness of the ice cream may be such that the loop will gradually settle down and the end walls serve to cut the bar into separate sections in the separate trays and merely by the action of gravity, although preferably the ice cream is a little stiffer than will permit such settling only by gravity, and additional means are provided for pressing the ice cream down and causing it to be severed by the end walls of the tray.

In Figs. 1 and 15 there is somewhat diagrammatically illustrated a wiper 52 which may be of resilient material and supported on an extension 53 of the frame of the apparatus. The lower end of the wiper is so positioned as to clear the upper edges of the end walls of the tray, and the inclined under surface of the wiper causes the ice cream, as the trays advance, to be pressed down into the trays at the ends of the latter and be severed by the end walls. If a wiper of this character is employed, it is preferably set somewhat at an angle as indicated in the drawings. Various other types of wipers may be employed. For instance, there may be employed a roller journaled on the support 53, or mounted in any other suitable manner and having its under surface engaging the ice cream bar as the latter passes beneath.

The frame of the apparatus supports the means employed for delivering the core material to the nozzle 47. In order that two different cores may be employed as shown in Figs. 9, 10, 13 and 14, there are preferably two units for supplying the core forming material, and these may be substantially identical in construction. Each unit includes a hopper or supply vessel 55 and a pump 56 connected by a pipe 57 to the nozzle. Each pump has an electric motor 58 for driving the same through a speed reducer 59 and a variable speed drive, such as a belt 60 with one of its pulleys of variable size. The motor is bodily adjustable transversely of the frame.

Obviously if only one core is to be formed in the product only one of these units would be operated.

The material supplied to the hopper or other vessel 55 may be partially frozen sherbet or ice cream, or may be a candy, such as fudge, but is preferably a jelly-like substance or a liquid which will jell by heat interchange as it passes through the inner nozzle, so that it will be relatively solid, that is, of form retaining plasticity as it emerges from the inner nozzle inside of the annular body of ice cream.

In case it is desired to apply fruit, nuts or other solids to the surface of the extruded bar, there may be provided a hopper 62 supported on an arm 63 and having its bottom outlet directly above the path of the travel of the bars and trays and beyond the depressing member or wiper 52. If desired, the hopper may be provided with an agitating member 64 therein which may be driven by a sprocket chain 65 from the shaft of the sprocket wheel 27. Nuts, bisque, candy or other solid particles of edible material or other analogous coating, may be employed in the hopper and a small amount will be sprinkled onto the upper side of the bar as it passes beneath the hopper. If desired, a second and similar hopper may be mounted at the opposite end of the frame and driven from the sprocket 26 so as to sprinkle a small amount of the same or analogous material in the bottom of the tray before the bar of ice cream is extruded into it.

At the delivery end the apparatus may be provided with guides for insuring the straight endwise travel of the pans or trays as they leave the conveyer and the latter passes around the sprocket 27. For this purpose there is shown a pair of spring guides 66 mounted on suitable brackets secured to the frame of the apparatus. In use the apparatus is brought into proper relationship to the freezer and to a refrigerating chamber which preferably has an opening 67 through the wall thereof so that with the apparatus in the proper position the trays will be discharged directly through the opening into the hardening room where they may be placed on shelves or other supports and permitted to remain until the ice cream is thoroughly hardened. After the hardening is accomplished the trays may be removed from the hardening room, the ice cream thawed loose from the trays and cut into individual service portions or other units. These units may be wrapped or otherwise enclosed and packed in suitable shipping containers. If desired before being wrapped they may be dipped in liquid chocolate or other coating material which will harden upon cooling. Where the portions are to be coated, the hopper 64 may be left empty and the driving connections to the agitator in the hopper may be disconnected.

To facilitate the movement of the apparatus into and out of position, the frame may be provided with suitable handles 68. Most of the operating parts of the apparatus are supported below the upper run of the conveyer. As illustrated the frame has a platform 69 upon which the several motors, pumps and most of the driving gearing are mounted.

Having thus described my invention, what I claim as new and desire to secure by Letters Patent is:

1. An apparatus for continuously making a series of separate bars of frozen comestible of form retaining hardness from a continuous bar extruded from a substantially horizontally directed nozzle, said apparatus including a portable frame having a conveyer mounted thereon, said conveyer having a series of flights and having a substantially horizontal run adapted to be disposed in substantial parallelism with said nozzle, a series of removable trays each supported by two of the flights and each flight serving to support the closely juxtaposed ends of two aligned trays, means for driving said conveyer at a rate substantially equal to the rate of extrusion of the continuous bar and directly onto the series of trays, and means for pressing downwardly the portion of the continuous bar looping over the ends of the trays to sever said continuous bar into sections in said trays.

2. An apparatus for continuously making a series of separate bars of frozen comestible of form retaining hardness from a continuous bar extruded from a substantially horizontally directed nozzle, said apparatus including a portable frame, an endless carrier mounted thereon and having a series of flights for supporting a series of trays with their end walls closely juxtaposed, means for varying the speed of the conveyer in accordance with the speed of travel of the extruded bar whereby said bar fills the trays in succession and loops over the juxtaposed end walls, and means for pressing the looped portions downwardly to sever it by means of said end walls.

3. An apparatus for continuously making a series of separate bars of frozen comestible of form retaining hardness from a continuous bar extruded from a substantially horizontally directed nozzle, said apparatus including a portable frame, an endless carrier mounted thereon and having a substantially horizontal run, spaced flights carried by said conveyer, removable adaptors secured to said flights, a series of trays having their end portions supported by said adaptors and with the end walls of successive trays closely juxtaposed.

ALMOND C. ROUTH.